US010535019B2

United States Patent
Baracaldo Angel et al.

(10) Patent No.: US 10,535,019 B2
(45) Date of Patent: *Jan. 14, 2020

(54) BOT-BASED DATA COLLECTION FOR DETECTING PHONE SOLICITATIONS

(71) Applicant: INTERNATIONAL BUSINESS MACHINES CORPORATION, Armonk, NY (US)

(72) Inventors: Nathalie Baracaldo Angel, San Jose, CA (US); Pawan R. Chowdhary, San Jose, CA (US); Heiko H. Ludwig, San Francisco, CA (US); Robert J. Moore, San Jose, CA (US); Taiga Nakamura, Sunnyvale, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/051,205

(22) Filed: Jul. 31, 2018

(65) Prior Publication Data

US 2018/0336916 A1    Nov. 22, 2018

Related U.S. Application Data

(63) Continuation of application No. 15/436,371, filed on Feb. 17, 2017, now Pat. No. 10,102,868.

(51) Int. Cl.
*G10L 21/00* (2013.01)
*G06N 20/00* (2019.01)
(Continued)

(52) U.S. Cl.
CPC .......... *G06N 20/00* (2019.01); *G10L 15/1822* (2013.01); *G10L 15/265* (2013.01);
(Continued)

(58) Field of Classification Search
CPC ...................................................... G10L 21/00
(Continued)

(56) References Cited

U.S. PATENT DOCUMENTS 6,246,672 B1 * 6/2001 Lumelsky ............... H04L 29/06
370/310
6,700,963 B1    3/2004 Jordan
(Continued)

FOREIGN PATENT DOCUMENTS

| CN | 102571487 A | 7/2012 |
|---|---|---|
| CN | 105187367 | 12/2015 |
| IN | 201641021969 | 7/2016 |

OTHER PUBLICATIONS

Pindrop Security, "The State of Phone Fraud 2014-2015 A Global, Cross-industry Threat", Sep. 8, 2016, pp. 1-16, White Paper, Pindropsecurity.com, United States.

(Continued)

*Primary Examiner* — Michael C Colucci
(74) *Attorney, Agent, or Firm* — Sherman IP LLP; Kenneth L. Sherman; Hemavathy Perumal

(57) ABSTRACT

One embodiment provides a method comprising answering one or more incoming phone calls received at one or more pre-specified phone numbers utilizing a bot. The bot is configured to engage in a conversation with a caller initiating an incoming phone call utilizing a voice recording that impersonates a human being. The method further comprises recording each conversation the bot engages in, and classifying each recorded conversation as one of poison data or truthful training data based on content of the recorded conversation and one or more learned detection models for detecting poisoned data.

15 Claims, 4 Drawing Sheets

(51) Int. Cl.
*G10L 15/26* (2006.01)
*G10L 17/06* (2013.01)
*G10L 15/18* (2013.01)

(52) U.S. Cl.
CPC ......... *G10L 17/06* (2013.01); *H04M 2201/41* (2013.01); *H04M 2203/6027* (2013.01)

(58) Field of Classification Search
USPC ............. 704/260, 275, 273, 9, 50, 233, 231; 709/206; 705/44
See application file for complete search history.

(56) References Cited

U.S. PATENT DOCUMENTS

| | | | |
|---|---|---|---|
| 7,540,021 B2 | 5/2009 | Page | |
| 7,904,518 B2 | 3/2011 | Marino et al. | |
| 8,411,833 B2 | 4/2013 | Dolan et al. | |
| 8,565,396 B1 | 10/2013 | Oliver et al. | |
| 8,769,671 B2 | 7/2014 | Shraim et al. | |
| 8,863,244 B2 | 10/2014 | Bono et al. | |
| 8,925,095 B2 | 12/2014 | Herz et al. | |
| 9,014,359 B1 | 4/2015 | Pfeffer et al. | |
| 9,116,877 B2 | 8/2015 | Chandramouli et al. | |
| 9,245,115 B1 | 1/2016 | Jakobsson | |
| 9,357,362 B2 | 5/2016 | Jin et al. | |
| 9,665,703 B2* | 5/2017 | Turgeman | G06F 21/32 |
| 9,690,915 B2* | 6/2017 | Turgeman | G06F 21/552 |
| 9,712,526 B2* | 7/2017 | Headley | G06F 21/32 |
| 9,729,727 B1* | 8/2017 | Zhang | H04M 15/47 |
| 2002/0091528 A1* | 7/2002 | Daragosh | G10L 15/30 704/270.1 |
| 2004/0006476 A1* | 1/2004 | Chiu | G10L 15/22 704/270.1 |
| 2006/0093998 A1* | 5/2006 | Vertegaal | G06F 3/011 434/236 |
| 2006/0215831 A1* | 9/2006 | Knott | H04M 3/493 379/211.02 |
| 2007/0201630 A1* | 8/2007 | Smith | H04L 12/64 379/67.1 |
| 2009/0055193 A1* | 2/2009 | Maislos | G06F 21/32 704/273 |
| 2010/0229245 A1 | 9/2010 | Singhal | |
| 2011/0129078 A1* | 6/2011 | Takeyama | H04M 3/436 379/201.02 |
| 2012/0254333 A1 | 10/2012 | Chandramouli et al. | |
| 2014/0119527 A1* | 5/2014 | Cohen | H04M 3/42059 379/207.13 |
| 2014/0122618 A1* | 5/2014 | Duan | H04L 51/02 709/206 |
| 2014/0192965 A1* | 7/2014 | Almeida | H04M 3/436 379/70 |
| 2014/0208424 A1* | 7/2014 | Hudack | G06F 21/316 726/23 |
| 2014/0237599 A1 | 8/2014 | Gertner et al. | |
| 2014/0297282 A1* | 10/2014 | Peters | G10L 15/19 704/254 |
| 2014/0365226 A1* | 12/2014 | Sinha | G10L 25/00 704/275 |
| 2014/0370838 A1 | 12/2014 | Kim et al. | |
| 2015/0039315 A1* | 2/2015 | Gross | G10L 15/22 704/273 |
| 2015/0288791 A1 | 10/2015 | Weiss et al. | |
| 2016/0005029 A1* | 1/2016 | Ivey | G09C 1/00 705/44 |
| 2016/0046023 A1* | 2/2016 | Nagendran | B25J 9/1689 700/248 |
| 2016/0063218 A1 | 3/2016 | Nachenberg | |
| 2016/0065528 A1 | 3/2016 | Weskler et al. | |
| 2016/0142398 A1 | 5/2016 | Lin | |
| 2016/0147992 A1 | 5/2016 | Zhao et al. | |
| 2016/0309281 A1* | 10/2016 | Lee | H04W 4/70 |
| 2016/0316057 A1 | 10/2016 | Korn | |
| 2016/0350589 A1* | 12/2016 | Chiu | G06K 9/00355 |
| 2017/0134574 A1 | 5/2017 | Winkler | |
| 2017/0180284 A1 | 6/2017 | Smullen et al. | |
| 2017/0344532 A1* | 11/2017 | Zhou | G06F 17/2881 |

OTHER PUBLICATIONS

Anonymous, "Security Control in Mobile Messaging Services", Oct. 23, 2014, pp. 1-2, ip.com, United States.

Linux Defenders, et al., "Method of Advanced Span Detection and Classification", Mar. 23, 2009, ipCapital Group, Inc., pp. 1-6, ip.com, United States.

International Business Machines Corporation (IBM), ""Unstable Code" Higher Level Compiler Messages Classification", Aug. 26, 2008, ip.com, United States.

Andriesse, D. et al., "Highly Resilient Peer-to-Peer Botnets Are Here: An Analysis of Gameover Zeus", Proceedings of the 2013 8th International Conference on Malicious and Unwanted Software: "The Americas" (Malware), Oct. 22-24, 2013, pp. 1-8, IEEE, United States.

Kale, A.R. et al., "An Advanced Hybrid Peer-to-Peer Botnet", International Journal of Wireless Communication, Mar. 15, 2012, pp. 15-19, vol. 2, Issue 1, Bioinfo Publications, United States.

Gruber, M. et al., "Voice Calls for Free: How the Black Market Establishes Free Phone Calls—Trapped and Uncovered by a VoIP Honeynet", Proceedings of the 2013 11th Annual Conference on Privacy, Secruity and Trust (PST), Jul. 10-12, 2013, pp. 205-212, IEEE, United States.

Tero, P. et al., "Cleverbot Data for Machine Learning", Jan. 2016, pp. 1-17, Existor.com [http://www.existor.com/en/ml-cleverbot-data-for-machine-learning.html], United Kingdom.

List of IBM Patents or Patent Applications Treated As Related.

List of IBM Patents or Patent Applications Treated as Related; Angel, Nathalie Baracaldo, U.S. Appl. No. 16/455,593, filed: Jun. 27, 2019.

List of IBM Patents or Patent Applications Treated As Related; Angel, Nathalie Baracaldo, U.S. Appl. No. 16/592,655, filed: Oct. 3, 2019.

* cited by examiner

BOT-BASED DATA COLLECTION FOR DETECTING PHONE SOLICITATIONS

The present invention generally relates to filtering unwanted phone solicitations, and more particularly, to a bot-based honeypot poison resilient data collection system and method for collecting training data for detecting or preventing unwanted phone solicitations.

BACKGROUND

Phone scams are fraud crimes initiated by perpetrators via phone calls or voice messages. Victims of phone scams may be affected financially and/or emotionally. For example, a victim of a phone scam is often tricked into providing money, private information, and/or remote access to one or more of their devices to a perpetrator of the phone scam over the phone. In recent years, hundreds of millions of dollars in financial losses are attributable to phone scams. Phone scams may affect any demographic (e.g., elderly, teenagers, other vulnerable populations, etc.) and any geographic location (e.g., countries, etc.).

SUMMARY

One embodiment provides a method comprising answering one or more incoming phone calls received at one or more pre-specified phone numbers utilizing a bot. The bot is configured to engage in a conversation with a caller who initiates an incoming phone call utilizing a voice recording that impersonates a human being. The method further comprises recording each conversation the bot engages in, and classifying each recorded conversation as one of poison data or truthful training data based on content of the recorded conversation and one or more learned detection models for detecting poisoned data.

These and other aspects, features and advantages of the invention will be understood with reference to the drawing figures, and detailed description herein, and will be realized by means of the various elements and combinations particularly pointed out in the appended claims. It is to be understood that both the foregoing general description and the following brief description of the drawings and detailed description of the invention are exemplary and explanatory of preferred embodiments of the invention, and are not restrictive of the invention, as claimed.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

Figure 1:
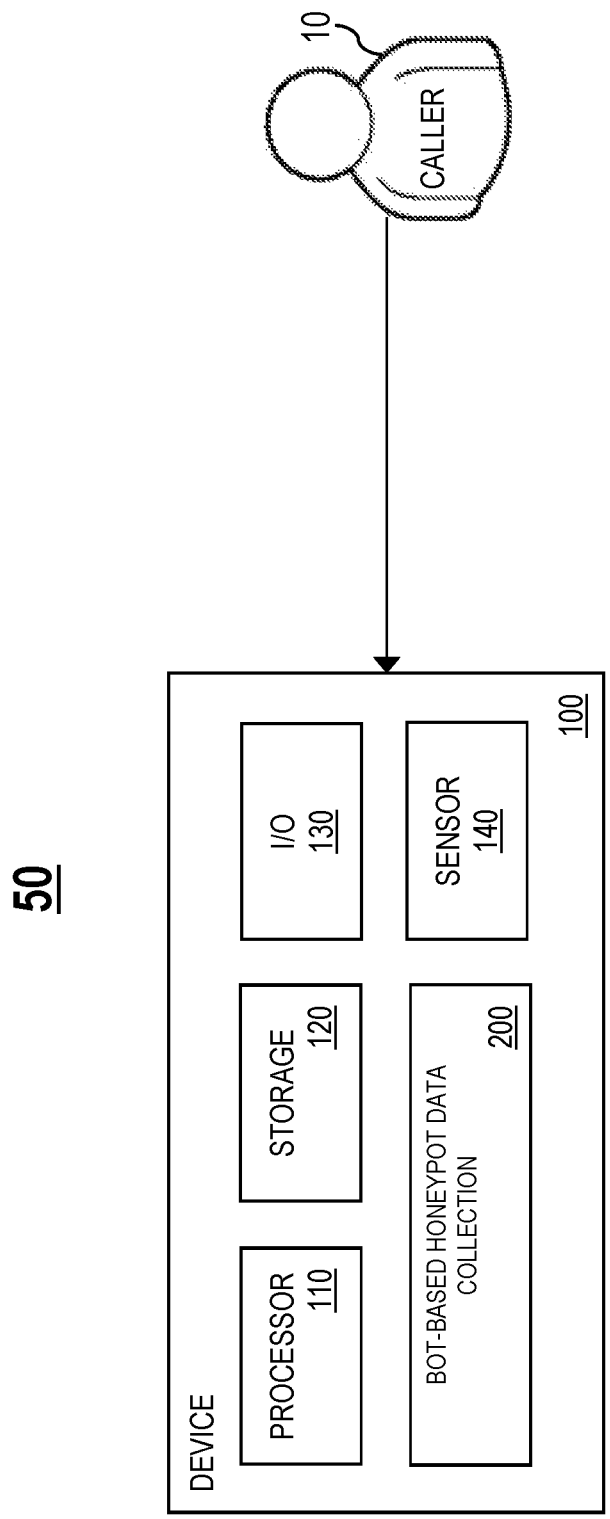
FIG. 1 illustrates an example computer architecture for collecting poison resilient training data for detecting/preventing unwanted phone solicitations, in accordance with an embodiment of the invention.

The detailed description explains the preferred embodiments of the invention, together with advantages and features, by way of example with reference to the drawings.

DETAILED DESCRIPTION

The present invention generally relates to filtering unwanted phone solicitations, and more particularly, to a bot-based honeypot poison resilient data collection system and method for collecting training data for detecting or preventing unwanted phone solicitations. One embodiment provides a method comprising answering one or more incoming phone calls received at one or more pre-specified phone numbers utilizing a bot. The bot is configured to engage in a conversation with a caller who initiates an incoming phone call utilizing a voice recording that impersonates a human being. The method further comprises recording each conversation the bot engages in, and classifying each recorded conversation as one of poison data or truthful training data based on content of the recorded conversation and one or more learned detection models for detecting poisoned data.

For expository purposes, the term "phone call" as used herein refers to any type of phone call such as, but not limited to, a phone call to/from a landline phone, a phone call to/from a mobile phone, a Voice over Internet Protocol (VoIP) phone call, a phone call to/from a satellite phone, and other types of phone calls.

For expository purposes, the term "caller" as used herein refers to a perpetrator of a phone scam, a telemarketing call, or another type of unwanted phone solicitation. The terms "caller", "scammer", "telemarketer", "perpetrator", and "adversary" may be used interchangeably in the specification.

For expository purposes, the term "target" as used herein refers to a target of a phone scam, a telemarketing call, or another type of unwanted phone solicitation. The terms "victim" and "target" may be used interchangeably in the specification.

For expository purposes, the term "honeypot" as used herein refers to a set of phone numbers that appears to be legitimate to adversaries but are actually isolated and monitored. For example, a honeypot of phone numbers may be used to receive phone calls; scammers/telemarketers who call the phone numbers are identified and later blocked.

For expository purposes, the term "poison data" as used herein refers to data that is crafted by an adversary to manipulate machine learning models that are trained based on such poison data, resulting in misclassifications that are to the advantage of the adversary (e.g., the adversary avoids detection).

Phone scams are difficult to prevent. Scam preventions systems may be used to block or prevent phone calls from known scammers. Existing scam/telemarketing detection/prevention systems typically involve filtering phone numbers of incoming phone calls based on a collection of phone numbers flagged as suspicious (i.e., blacklisted). Finding training data for training scam/telemarketing detection/prevention systems, however, is difficult. Further, adversaries may poison training data collected for use in training scam/telemarketing detection/prevention systems, resulting in misclassifications that are to the advantage of the adversaries (e.g., the adversaries avoid detection, the scam/telemarketing detection/prevention system functions poorly, etc.).

One embodiment provides a bot-based honeypot data collection framework for collecting training data for systems that filter unwanted phone solicitations. The framework may be used to collect training data for different types of systems that filter unwanted phone solicitations such as, but not limited to, a scam detection/prevention system for detecting and blocking phone scams, a telemarketing detection/prevention system for detecting and blocking telemarketing calls, a system for detecting phone calls soliciting donations to various organizations, a system for detecting phone calls influencing voters to vote in a particular manner (e.g., vote for a particular candidate, vote for a particular legislation, etc.), and other types of systems for filtering undesirable phone calls.

In one embodiment, the framework is resilient against adversaries that try to poison the training data collected (i.e., the data collected is poison resilient). The framework utilizes a honeypot of unused phone numbers for receiving phone calls. As the unused phone numbers do not serve any legitimate purpose (e.g., not used as a residence phone number, a business phone number, an emergency phone number, etc.), the phone calls received are likely unsolicited/undesired phone calls, such as phone calls from telemarketers, bots, and scammers. The framework utilizes a bot that impersonates a human being to answer phone calls received at the phone numbers. To entice an adversary who placed an unsolicited phone call into making a pitch, the bot engages in a conversation with the adversary to collect information relating to the unsolicited phone call.

In one embodiment, the framework runs one or more defensive mechanisms to verify that the information collected is not poisoned by an adversary. The verified information may be used as training data for training a system for filtering unwanted phone solicitations, such as a scam/telemarketing detection/prevention system for detecting signatures of known phone scams and unwanted phone solicitations.

FIG. 1 illustrates an example computer architecture 50 for collecting poison resilient training data for detecting/preventing unwanted phone solicitations, in accordance with an embodiment of the invention. The computer architecture 50 comprises an electronic device 100 including computation resources, such as one or more processor units 110 and one or more storage units 120. One or more applications may execute/operate on the device 100 utilizing the computation resources of the device 100. In one embodiment, the applications include, but are not limited to, a bot-based honeypot data collection system 200. A honeypot of pre-specified phone numbers is assigned to the system 200. In one embodiment, the pre-specified phone numbers comprise unused phone numbers that do not serve any legitimate purpose. As described in detail later herein, the system 200 is configured to answer an incoming phone call to one of the pre-specified phone numbers, engage in a conversation with a caller 10 who initiated the phone call utilizing a bot configured to impersonate a human being, and record the conversation. Each recorded conversation is classified as one of poison data or truthful training data.

A recorded conversation classified as truthful training data may be used as training data for training a system that filters unwanted phone solicitations such as, but not limited to, a scam detection/prevention system for detecting and blocking phone scams from scammers, a telemarketing detection/prevention system for detecting and blocking telemarketing calls from telemarketers, a system for detecting phone calls soliciting donations to various organizations, a system for detecting phone calls influencing voters to vote in a particular manner (e.g., vote for a particular candidate, vote for a particular legislation, etc.), and other types of systems for filtering undesirable phone calls.

The device 100 may be any type of electronic device, such as, but not limited to, a mobile device (e.g., a smart phone, a laptop, a tablet, etc.), a digital telephone, a server connected to a local network, etc.

In one embodiment, the device 100 comprises one or more input/output (I/O) modules 130 integrated in or coupled to the device 100, such as a keyboard, a keypad, a touch interface, a display screen, etc. A user may utilize an I/O module 130 to configure one or more settings for data collection (e.g., setting up phone numbers that the system 200 is configured to receive phone calls for, etc.).

In one embodiment, the device 100 comprises one or more sensor modules 140 integrated in or coupled to the device 100, such as a microphone, GPS, etc. The one or more sensor modules 140 may be utilized to collect data relating to a phone call answered by the system 200. For example, in response to receiving an incoming phone call from a caller 10, the system 200 may utilize a microphone of the device 100 to record a conversation with the caller 10; a recording of the phone call may be utilize as training data for training a scam/telemarketing detection/prevention system.

Figure 2:
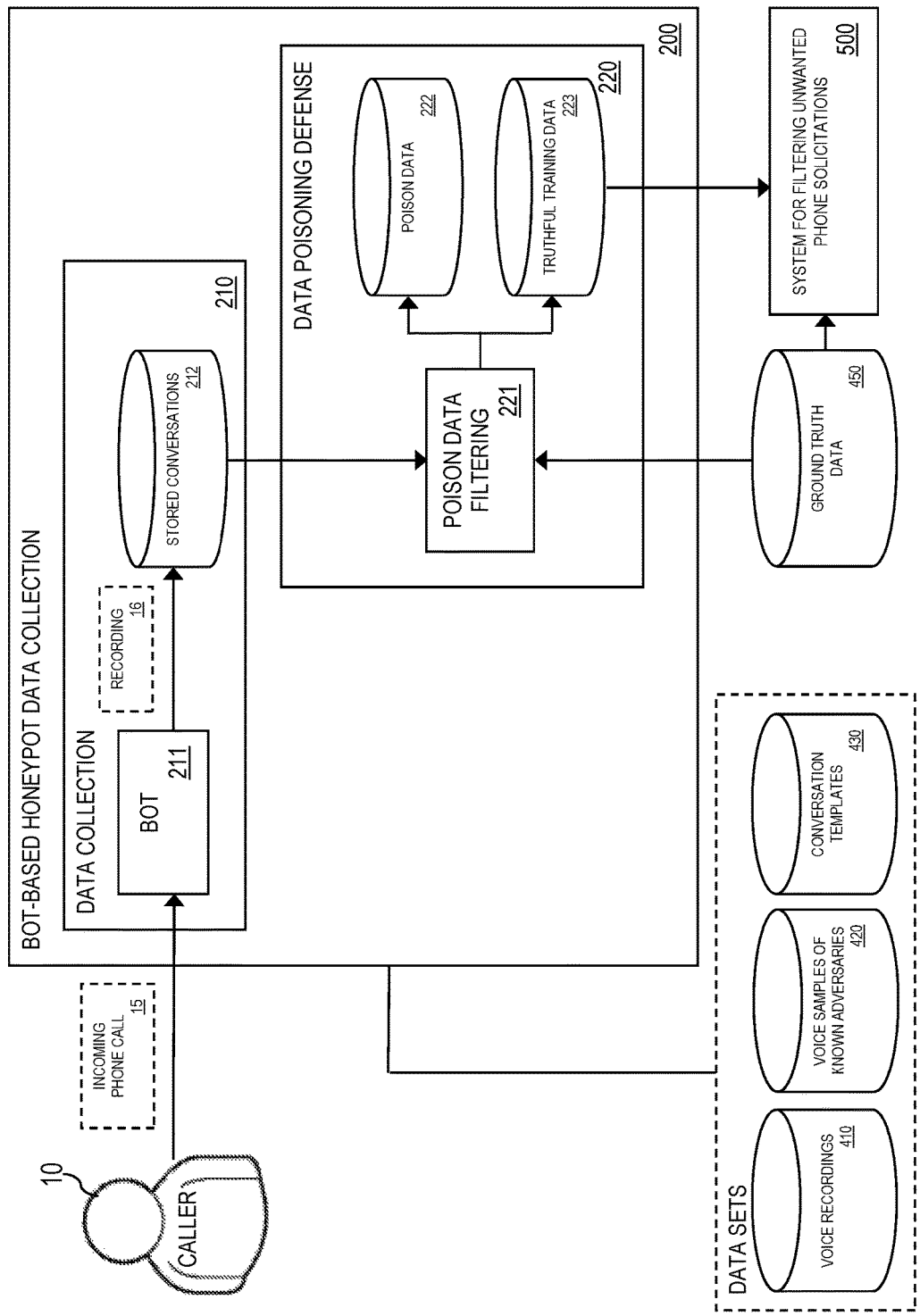
FIG. 2 illustrates an example bot-based honeypot data collection system in detail, in accordance with an embodiment of the invention.

FIG. 2 illustrates an example bot-based honeypot data collection system 200 in detail, in accordance with an embodiment of the invention. One or more components of the system 200 may utilize one or more data sets such as, but not limited to, the following: (1) a first data set 410 maintaining voice recordings of different individuals the system 200 may impersonate (e.g., voice recordings of the elderly, teenagers, and other persons typically targeted by adversaries), (2) a second data set 420 maintaining learned scam information (e.g., using machine learning (ML)) including voice samples of existing/known adversaries (e.g., voice samples of scammers, telemarketers, etc.), and (3) a third data set 430 maintaining different conversation templates. Each data set may be maintained locally on the device 100 or remotely (e.g., on a remote server).

The system 200 comprises a data collection unit 210 configured to collect data relating to an incoming phone call 15 made to a pre-specified phone number assigned to the system 200. In one embodiment, the data collection unit 210 comprises a bot 211. The bot 211 is a software application configured to run automated tasks. Specifically, the bot 211 is configured to impersonate a human being when answering an incoming phone call to a pre-specified phone number from a caller 10. Specifically, the bot 211 engages in a conversation with the caller 10 utilizing a voice recording that sounds human. The voice recording may be selected from the data set 410 to impersonate an individual belonging to any type of demographic or population. For example, a scammer may be tricked/enticed into engaging in a conversation with the bot 211 utilizing a voice recording that impersonates common victims of scams, such as the elderly, teenagers, or other persons who are typically vulnerable to scams.

In one embodiment, the both agent 211 is configured to engage and establish a conversation with a caller 10 by dynamically conversing with the caller 10 based on a conversation template including learned dialogue/conversation patterns. For example, the bot 211 may select the conversation template from the data set 430. The use of the conversation template increases the likelihood the caller 10 perceives the bot 211 as a human being, not a bot.

In one embodiment, the bot 211 is configured to record its conversation with a caller 10. A resulting recording 16 of the conversation ("recorded conversation") is stored in a first database 212. The first database 212 may be maintained locally on the device 100 or remotely (e.g., on a remote server).

In one embodiment, the bot 211 is configured to invoke/ apply a speech-to-text service/process to transcribe a recording 16 of a conversation between a caller 10 and the bot 211 into a transcript of text.

In one embodiment, each recorded conversation maintained in the first database 212 has corresponding metadata, such as a transcript of the conversation, follow-up contact information (e.g., a phone number of a caller 10), etc.

In one embodiment, the bot 211 is configured to determine an identity of a caller 10 by comparing voice patterns of the caller 10 against voice samples of known adversaries (e.g., scammers, telemarketers, etc.). For example, the bot 211 may recognize a caller 10 as a known scammer/telemarketer if a voice of the caller 10 matches or is substantially similar to a voice sample maintained in the data set 420.

The system 200 comprises a data poisoning defense unit 220 configured to protect data collected by the data collection unit 210 against adversaries trying to poison the data collected. In one embodiment, the data poisoning defense unit 220 comprises a poison data filtering unit 221 configured to receive data collected by the data collection unit 210 (i.e., recorded conversations stored in the first database 212), and filter the data collected by applying one or more learned defensive mechanisms to detect poisoned data. As a result of the filtering, each recorded conversation may be classified into one of the following classification groups: (1) poison data, or (2) truthful training data.

Each recorded conversation classified as poison data is maintained in a second database 222 with corresponding metadata (e.g., a transcript of the conversation, follow-up contact information, etc.). The recorded conversations maintained in the second database 222 represent poisoned data that should not be used as training data for a system that filters unwanted phone solicitations (e.g., scam/telemarketing detection/prevention systems, etc.).

Each recorded conversation classified as truthful training data is maintained in a third database 223 with corresponding metadata (e.g., a transcript of the conversation, follow-up contact information, etc.). The recorded conversations maintained in the third database 223 represent poison resilient data that may be used as training data for training a system that filters unwanted phone solicitations (e.g., scam/ telemarketing detection/prevention systems, etc.). Each database 222, 223 may be maintained locally on the device 100 or remotely (e.g., on a remote server).

In one embodiment, the one or more learned defensive mechanisms applied by the poison data filtering unit 221 comprise applying at least one learned detection model. Examples of different learned detection models the poison data filtering unit 221 may apply include, but are not limited to, the following: a data point inspection model for inspecting and evaluation impact of a particular training data point in a resulting classification, a normality model for identifying data deviations, a set of classifies that the poison data filtering unit 221 may rotate to avoid an adversary circumventing a particular classifier, a cross-source consistency checking model for cross-checking different data sources and identifying data deviations between the data sources, etc. In another embodiment, the poison data filtering unit 221 may apply one or more other types of detection models.

One or more of the learned detection models (e.g., a cross-source consistency checking model) may require ground truth data. For example, the poison data filtering unit 221 may obtain ground truth data from a data set 450. The data set 450 may be maintained locally on the device 100 or remotely (e.g., on a remote server).

In one embodiment, each learned detection model utilized by the poison data filtering unit 221 is trained online (i.e., on the device 100) or offline (i.e., not on the device 100). For example, in a training stage, a detection model may be trained on a remote server using machine learning. After training, the resulting learned detection model may be loaded onto/downloaded to the device 100 as a portion of the system 200 for use in a deployment stage.

In one embodiment, a system 500 for filtering unwanted phone solicitations (e.g., scam/telemarketing detection/prevention systems, etc.) may be trained based on training data comprising ground truth data maintained in the data set 450 and/or poison resilient data maintained in the third database 223. For example, if the system 500 is implemented as a scam/telemarketing detection/prevention system, the system 500 may be trained to detect signatures of known phone scams and unwanted phone solicitations, and support real-time analysis of communications (e.g., a live phone call) between an adversary (e.g., a scammer, a telemarketer, etc.) and a target/potential victim of the adversary (e.g., the elderly, teenagers, etc.) to detect attributes that indicate phishing, scams, telemarketing, etc. The system 500 may be a component of the system 200 or a component of an external system. An embodiment of the scam/telemarketing detection/prevention system is described in commonly-assigned, co-pending U.S. Non-Provisional patent application entitled "CONVERSATION AND CONTEXT AWARE FRAUD AND ABUSE PREVENTION AGENT" Ser. No. 15/436,357, filed on the same day as the present application. Another embodiment of the scam/telemarketing detection/ prevention system is described in commonly-assigned, co-pending U.S. Non-Provisional patent application entitled "OUTGOING COMMUNICATION SCAM PREVENTION" Ser. No. 15/436,365, filed on the same day as the present application.

As another example, the system 500 may be implemented as one or more other types of systems for filtering unwanted phone solicitations such as, but not limited to, a system for detecting phone calls soliciting donations to various organizations, a system for detecting phone calls influencing voters to vote in a particular manner (e.g., vote for a particular candidate, vote for a particular legislation, etc.), and other types of systems for filtering undesirable phone calls.

Figure 3:
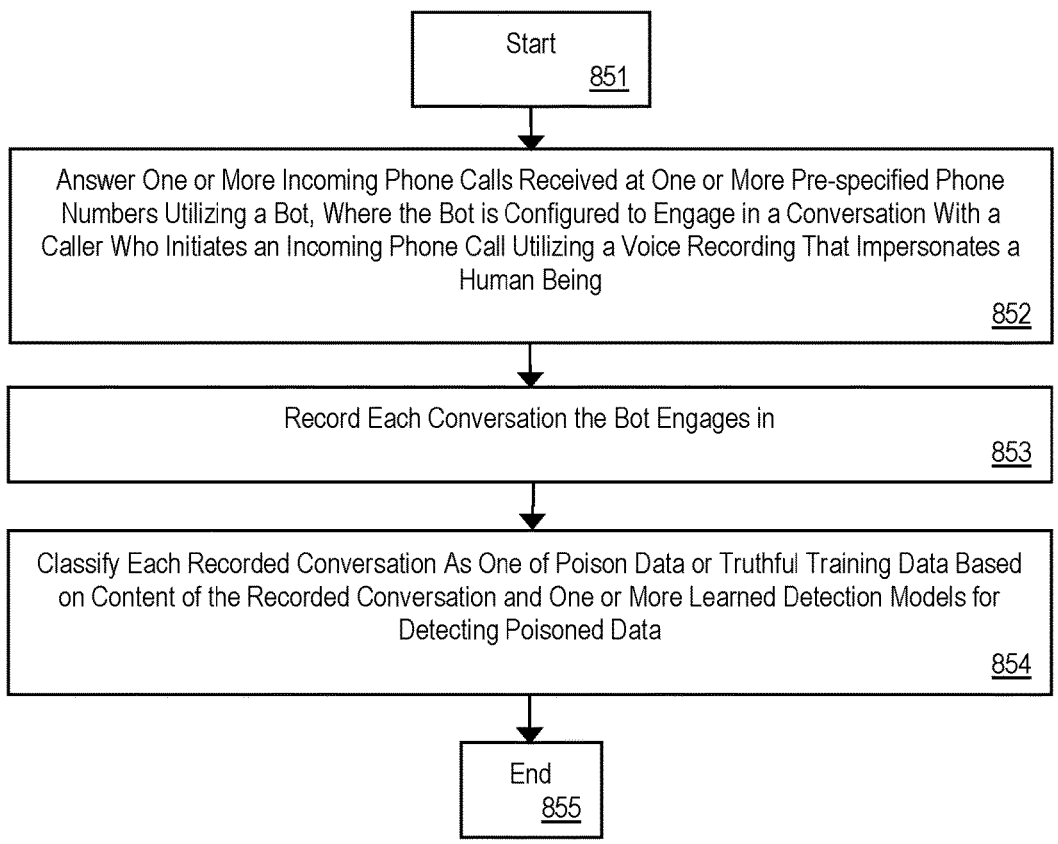
FIG. 3 is a flowchart for an example process for collecting poison resilient training data for detecting/preventing unwanted phone solicitations.

FIG. 3 is a flowchart for an example process 850 for collecting poison resilient training data for detecting/preventing unwanted phone solicitations, in accordance with an embodiment of the invention. In process block 851, process 850 starts. In process block 852, answer one or more incoming phone calls received at one or more pre-specified phone numbers utilizing a bot, where the bot is configured to engage in a conversation with a caller who initiates an incoming phone call utilizing a voice recording that impersonates a human being.

In process block 853, record each conversation the bot engages in.

In process block 854, classify each recorded conversation as one of poison data or truthful training data based on content of the recorded conversation and one or more learned detection models for detecting poisoned data.

In process block 855, the process 850 ends.

In one embodiment, process blocks 851-855 are performed by one or more components of the system 200, such as the data collection unit 210 and the data poisoning defense unit 220.

Figure 4:
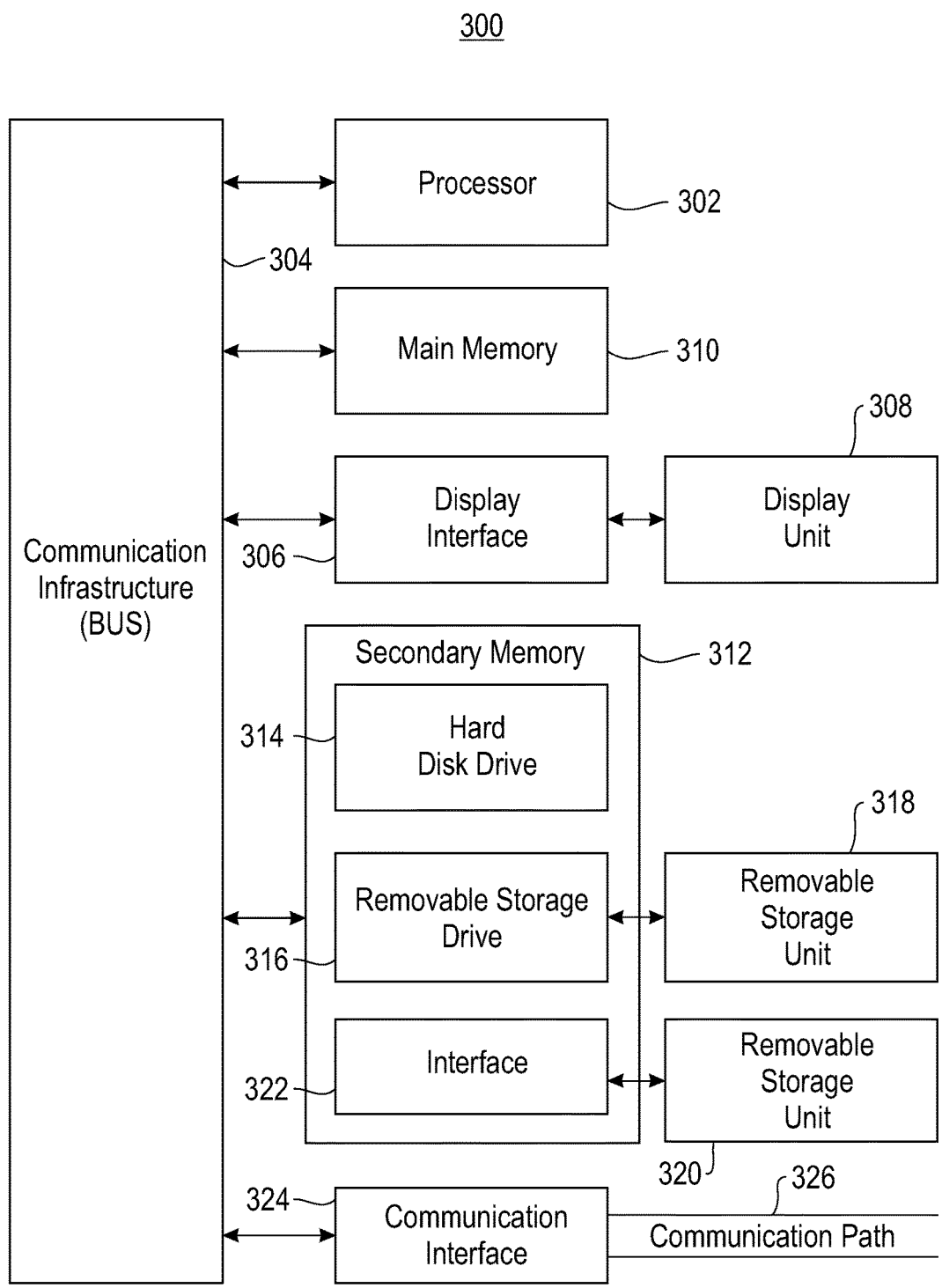
FIG. 4 is a high level block diagram showing an information processing system useful for implementing an embodiment of the present invention.

FIG. 4 is a high level block diagram showing an information processing system 300 useful for implementing one embodiment of the invention. The computer system includes one or more processors, such as processor 302. The processor 302 is connected to a communication infrastructure 304 (e.g., a communications bus, cross-over bar, or network).

The computer system can include a display interface 306 that forwards graphics, text, and other data from the voice communication infrastructure 304 (or from a frame buffer not shown) for display on a display unit 308. The computer system also includes a main memory 310, preferably random access memory (RAM), and may also include a secondary memory 312. The secondary memory 312 may include, for example, a hard disk drive 314 and/or a removable storage drive 316, representing, for example, a floppy disk drive, a magnetic tape drive, or an optical disk drive. The removable storage drive 316 reads from and/or writes to a removable storage unit 318 in a manner well known to those having ordinary skill in the art. Removable storage unit 318 represents, for example, a floppy disk, a compact disc, a magnetic tape, or an optical disk, etc. which is read by and written to by removable storage drive 316. As will be appreciated, the removable storage unit 318 includes a computer readable medium having stored therein computer software and/or data.

In alternative embodiments, the secondary memory 312 may include other similar means for allowing computer programs or other instructions to be loaded into the computer system. Such means may include, for example, a removable storage unit 320 and an interface 322. Examples of such means may include a program package and package interface (such as that found in video game devices), a removable memory chip (such as an EPROM, or PROM) and associated socket, and other removable storage units 320 and interfaces 322, which allows software and data to be transferred from the removable storage unit 320 to the computer system.

The computer system may also include a communication interface 324. Communication interface 324 allows software and data to be transferred between the computer system and external devices. Examples of communication interface 324 may include a modem, a network interface (such as an Ethernet card), a communication port, or a PCMCIA slot and card, etc. Software and data transferred via communication interface 324 are in the form of signals which may be, for example, electronic, electromagnetic, optical, or other signals capable of being received by communication interface 324. These signals are provided to communication interface 324 via a communication path (i.e., channel) 326. This communication path 326 carries signals and may be implemented using wire or cable, fiber optics, a phone line, a cellular phone link, an RF link, and/or other communication channels.

The present invention may be a system, a method, and/or a computer program product. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

From the above description, it can be seen that the present invention provides a system, computer program product, and method for implementing the embodiments of the invention. The present invention further provides a non-transitory computer-useable storage medium for implementing the embodiments of the invention. The non-transitory computer-useable storage medium has a computer-readable program, wherein the program upon being processed on a computer causes the computer to implement the steps of the present invention according to the embodiments described herein. References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
answering one or more incoming phone calls utilizing a bot, wherein the bot is configured to engage in a conversation with a caller who initiates an incoming phone call utilizing a voice recording that impersonates a human being belonging to a particular demographic targeted by the caller, and the bot is further configured to dynamically converse with the caller based on a conversation template including one or more learned conversation patterns to increase a likelihood the caller perceives the bot as the human being belonging to the particular demographic belonging to the particular demographic;
detecting one or more unwanted phone solicitations based on a real-time analysis of each conversation the bot engages in; and
filtering each unwanted phone solicitation detected.

2. The method of claim 1, wherein the bot is configured to dynamically converse with the caller based on the conversation template.

3. The method of claim 1, wherein the bot is configured to impersonate any human being belonging to any type of demographic or population by selecting and using a voice recording impersonating the human being.

4. The method of claim 1, wherein detecting one or more unwanted phone solicitations comprises:
applying a learned detection model to each conversation the bot engages in to detect one or more attributes indicating a scam or telemarketing.

5. The method of claim 4, wherein detecting one or more unwanted phone solicitations further comprises:
determining an identity of a caller initiating an incoming phone call by comparing voice patterns of the caller against one or more voice samples of one or more known scammers or telemarketers.

6. A system comprising:
at least one processor; and
a non-transitory processor-readable memory device storing instructions that when executed by the at least one processor causes the at least one processor to perform operations including:
answering one or more incoming phone calls utilizing a bot, wherein the bot is configured to engage in a conversation with a caller who initiates an incoming phone call utilizing a voice recording that impersonates a human being belonging to a particular demographic targeted by the caller, and the bot is further configured to dynamically converse with the caller based on a conversation template including one or more learned conversation patterns to increase a likelihood the caller perceives the bot as the human being belonging to the particular demographic;
detecting one or more unwanted phone solicitations based on a real-time analysis of each conversation the bot engages in; and
filtering each unwanted phone solicitation detected.

7. The system of claim 6, wherein the bot is configured to dynamically converse with the caller based on the conversation template.

8. The system of claim 6, wherein the bot is configured to impersonate any human being belonging to any type of demographic or population by selecting and using a voice recording impersonating the human being.

9. The system of claim 6, wherein detecting one or more unwanted phone solicitations comprises:
applying a learned detection model to each conversation the bot engages in to detect one or more attributes indicating a scam or telemarketing.

10. The system of claim 9, wherein detecting one or more unwanted phone solicitations further comprises:
determining an identity of a caller initiating an incoming phone call by comparing voice patterns of the caller against one or more voice samples of one or more known scammers or telemarketers.

11. A computer program product comprising a computer-readable hardware storage medium having program code embodied therewith, the program code being executable by a computer to implement a method comprising:
answering one or more incoming phone calls utilizing a bot, wherein the bot is configured to engage in a conversation with a caller who initiates an incoming phone call utilizing a voice recording that impersonates a human being belonging to a particular demographic targeted by the caller, and the bot is further configured to dynamically converse with the caller based on a conversation template including one or more learned conversation patterns to increase a likelihood the caller perceives the bot as the human being belonging to the particular demographic;
detecting one or more unwanted phone solicitations based on a real-time analysis of each conversation the bot engages in; and
filtering each unwanted phone solicitation detected.

12. The computer program product of claim 11, wherein the bot is configured to dynamically converse with the caller based on the conversation template.

13. The computer program product of claim 11, wherein the bot is configured to impersonate any human being belonging to any type of demographic or population by selecting and using a voice recording impersonating the human being.

14. The computer program product of claim 11, wherein detecting one or more unwanted phone solicitations comprises:
applying a learned detection model to each conversation the bot engages in to detect one or more attributes indicating a scam or telemarketing.

15. The computer program product of claim 14, wherein detecting one or more unwanted phone solicitations further comprises:
determining an identity of a caller initiating an incoming phone call by comparing voice patterns of the caller against one or more voice samples of one or more known scammers or telemarketers.

* * * * *